Jan. 18, 1966     D. J. CHLECK     3,230,368
ATMOSPHERIC CHEMICAL SENSORY SYSTEMS
Filed Nov. 15, 1962     2 Sheets-Sheet 1

INVENTOR.
David J. Chleck
BY
Attorney

Jan. 18, 1966  D. J. CHLECK  3,230,368
ATMOSPHERIC CHEMICAL SENSORY SYSTEMS
Filed Nov. 15, 1962  2 Sheets-Sheet 2

INVENTOR.
David J. Chleck
BY
Attorney

United States Patent Office 3,230,368
Patented Jan. 18, 1966

3,230,368
ATMOSPHERIC CHEMICAL SENSORY SYSTEMS
David J. Chleck, Dedham, Mass., assignor, by mesne assignments, to the United States of America as represented by the Secretary of the Navy
Filed Nov. 15, 1962, Ser. No. 238,064
8 Claims. (Cl. 250—71.5)

The present invention relates generally to apparatus for and methods of detecting the presence and amount of an oxidizing substance in a gaseous medium and, more particularly, to a reaction cell and systems utilizing this cell for separating atomic oxygen and ozone and measuring their concentration within a gaseous medium.

In one well-known method for measuring ozone concentration, the gas stream is bubbled through a solution of potassium iodide which is oxidized to release free iodine, and this iodine is measured by thiosulphate titration or colorimetry. Another standard method, the fluorescent one, uses either the oxidation of a fluorescent substance, such as fluorescein, to a nonfluorescent one or the oxidation of a nonfluorescent substance, for example dihydroacridine, to a fluorescent one. A third method makes use of the absorption of visible or ultraviolet light by ozone. One important disadvantage of this last method is that the system responds to colored contaminants and dust. A method newer than the above three, which has increased sensitivity, depends upon the cracking of stretched rubber by the action of ozone.

None of these methods is, however particularly suitable for field use since they depend upon liquid absorbents, constant potential supplies and bulky batteries.

In the May 1961 issue of "Nucleonics," published by McGraw-Hill, there is an article entitled, "Ozone Analyzer Uses Radioactive Clathrate," having as one of its authors David J. Chleck, which describes how ozone concentration can be measured by running a gas stream over a $Kr^{85}$ containing quinol clathrate and observing the amount of radioactivity released. This analyzer, which can detect ozone concentrations in the parts per ten billion range or smaller has a dramatically increased sensitivity over conventional devices. Also because it contains no solutions, it is rugged and portable.

In the September 1959 issue of "Nucleonics," there is an article by the inventor entitled, "Krypton in a Cage—Clathrate $\beta$ Sources," which sets forth a procedure for producing radioactive clathrates of the type employed in the above ozone analyzer which involves crystal growth from a melt rather than from a water solution. More particularly, a sample of quinol is placed in a pressure vessel, the atmospheric gases are eliminated and the apparatus then filled with carrier-free krypton containing 5% $Kr^{85}$. The quinol is then heated to slightly above its melting point 185° C. and thereafter slowly cooled over a long period of time. High gas pressure and controlled cooling are the factors which are employed to prevent rapid crystal formation. The maximum clathrating efficiency obtained with the above process occurred at sixty atmospheres and over a seventy-two-hour growth period. Clathrate compounds prepared by the above method contained about 25% of the theoretical maximum of krypton.

The quinol-$Kr^{85}$ clathrate thus prepared, as mentioned hereinbefore, may be used in a sensing cell to detect and measure those nonradioactive compounds which are capable of oxidizing the clathrate and releasing the radioactive krypton. For example, ozone oxides quinol to quinone to liberate the krypton as follows:

(1) $[C_6H_4(OH_2)]_3 \cdot Kr^{85} + O_3$
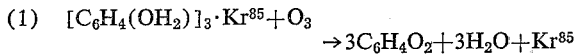

Since radioactivity determinations are far more sensitive and easier to make than similar level determinations dependent on physical and chemical changes, the ozone analysizing apparatus of the above article has a greater sensitivity and structural simplicity than prior art devices.

In atmospheric research, it is oftentimes important to obtain a vertical distribution of the amount of atomic oxygen and ozone from sea levels up to one hundred kilometers. The reaction cell hereinbefore described, unfortunately, does not possess either the sensitivity or speed of response to operate in flight instruments. The reason for this is that the reaction requirements encountered in upper atmosphere research are rather extreme. For example, to give adequate speed of response for altitude differentiation, the air stream must replace the air in a measuring cell which is equipped with a Geiger tube at least once a minute for a balloon sonde and every few seconds for a drop sonde. Since the free volume in the reaction cell is usually very small, about 0.05 ml., the velocity of the air through this component is extremely high. A molecule of air is in residence in the reaction cell for only about a few milliseconds. Therefore, to achieve a high efficiency of response, the reaction must be speeded up from a few minutes to a few milliseconds, a change of rate of five orders of magnitude, if unreacted ozone is not to come streaming out of the reaction cell.

It is accordingly a primary object of the present invention to provide a method for increasing the rate of oxidation of organic compounds in heterogenous gas solid reactions.

Another object of the present invention is to provide a sensing cell for detecting ozone which has a response time in the millisecond range.

A yet still further object of the present invention is to provide a method for preparing $Kr^{85}$ clathrates having a high reaction efficiency.

A yet still further object of the present invention is to provide a radioactive clathrate of high specific activity which is stable over long periods of storage and use.

A yet still further object of the present invention is to provide a method for preparing radioactive krypton clathrate compounds having rapid oxidation characteristics.

A still further object of the present invention is to provide a method and apparatus for the separation of atomic oxygen and ozone based on radioactive krypton clathrates.

A still further object of the present invention is to provide an ozone analyzer which is flow rate independent.

A yet still further object of the present invention is to provide apparatus for the separate measurement of atomic oxygen and ozone utilizing chemiluminescence effects.

A yet still further object of the present invention is to provide an apparatus for the separate measurement of atomic oxygen and ozone based on both clathrates and chemiluminescene.

Other objects, advantages and novel features of the invention will become apparent from the following detailed description of the invention when considered in conjunction with the accompanying drawings wherein.

Figure 1:
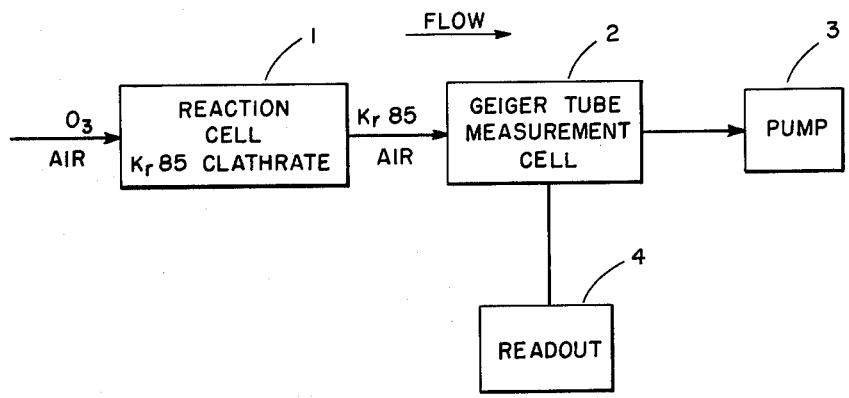
FIG. 1 is a block diagram of a system for measuring the concentration of ozone in a gaseous medium.

The response to ozone of the analyer reported in the "Nucleanics" article is (2)  $\quad$ c.p.m.$=k(\text{conc. } O_3)^{1/3}$ where c.p.m. is the counts per minute observed by the Geiger tube. This response indicates that the reaction for ozone is incomplete and yields only a few percent of what is theoretically possible on complete reaction with high flow rates needed for atmospheric sampling. Normally, fractional order of reaction is common to a gas-solid heterogeneous surface reaction. It implies a condition of intermediate surface coverage with regard to gas molecules. Thus, this order of response should shift to zero or one, depending upon concentration, if it is, in fact, caused by surface coverage. It has been found, however, that the above fractional order is not due to this condition but to the fact that the oxidation occurs through atomic oxygen and not through the various molecular species such as $O_2$ and $O_3$. Thus, the ozone in the gas stream undergoes slow decomposition from an equilibrium to atomic oxygen before reaction in the manner described below:

(3) $\quad (O_3) + 3(S) = 3(O-S)$ $\quad\quad$ gas $\quad$ solid $\quad$ complex of
$\quad\quad\quad\quad$ site $\quad\quad$ gas on solid (4) $\quad K\text{ eq} = \left[\dfrac{O-S}{S}\right]^{1/3} \dfrac{1}{[O_3]}$ The order of response of the aforementioned instrument is, therefore, one-third with respect to ozone and one with respect to atomic oxygen which implies that the reaction rate with ozone is very fast.

The present invention in one aspect thereof increases the reaction rate by accelerating the decomposition of ozone to atomic oxygen in the reaction cell. In one particular embodiment of the present invention, a catalyst in the form of calcium silicate or aluminum oxide is utilized to bring about the above decomposition. Compounds in the silica family give a high reaction efficiency yet do not weaken the clathrate cage bond to the point where the krypton gas leaks out as a result of the interaction between the catalyst and hydroquinone or improved oxidation due to air.

Clathrate compounds prepared in accordance with the method described in the "Nucleonics" article of September 1959 are in the form of hard, fused masses which must be ground to a powder before they can be used in the reaction cell. This grinding process deadens reaction sites and results in a loss of gas at the reaction centers due to the high temperature oxidations effected at the grinding points. Thus, the clathrate itself has been found to be a major source of the reaction inefficiency previously mentioned.

According to one aspect of the present invention, the $Kr^{85}$ clathrate is prepared as follows: Approximately equal volumes of a silica compound such as calicum silicate and hydroquinone are placed in an inert, heavy liquid such as carbon tetrachloride. The calcium silicate, of course, precipitates to the bottom while the hydroquinone floats on top. This mixture is then heated at the boiling point of the carbon tetrachloride. Upon complete disappearance of the organic, the mixture is decanted and allowed to dry. After drying, the powder is placed in a pressure vessel and clathrated according to the technique previously outlined. However, since the hydroquinone is absorbed into the calcium silicate, the process no longer results in a hard mass but in a finely dispersed powder which can be used in the sensing cell directly. Clathrates produced by the above method have been found to have high specific activities of up to 1 c./gr. and display excellent stability over long periods of storage and use. When used as ozone detectors, they display high reaction efficiency and are very reproducible.

The efficiency of the reaction cell can be improved to 100% by means of a second catalyst, such as platinum black, added according to the following procedure:

(1) A small quantity of platinum black is mixed with an inert carrier, such as sand, and boiled in carbon tetrachloride.

(2) The platinum under these conditions will coat the sand. The quantity of platinum is not critical since the sand will absorb only a finite amount of catalysts.

(3) The mixture is decanted and dried and the excess platinum shaken off, leaving only the coated sand.

(4) Equal volumes of this coated sand are mixed dry with the catalyzed clathrate prepared via the process previously described.

Reaction cells made of this material will provide the maximum theoretical efficiency at flow rates of one liter per minute without deterioration in storage or use. Under these flow conditions, the half life of the reaction is about one millisecond, improving the reaction rate by five orders of magnitude of the untreated clathrate which has a half life of about two minutes, as mentioned previously. The advantages realized with a 100% cell in the analyzer will be pointed out hereinafter.

FIG. 1 illustrates an arrangement for measuring the amount of ozone in a gaseous medium which utilizes a catalyzed clathrate prepared according to the above described method as the reaction substance. In this configuration the gaseous medium under investigation is drawn into the instrument and placed in contact with the catalyzed clathrate reaction cell 1. The gaseous $Kr^{85}$, which is released in an amount proportional to the ozone concentration, is swept into the air stream and then transported to a measuring cell 2 which contains a Geiger tube. The output of this tube is registered in a conventional readout device 4. After passing through the measuring cell, the air stream is exited from the system by pump 3 which establishes the flow through the complete system.

Most gas analyzing systems of the prior art, including those employing a chemiluminescent phenomenon, have an output signal which is a function not only of the reactant gas concentration but also of its arrival rate. In other words, the output signal is a measure of the total weight of the gas arriving at the sensor per unit time. Because of this flow rate dependency, precise sampling and pumping apparatus must be included in these systems in order for the gas concentration to be accurately determined.

These requirements are eliminated with the catalyzed clathrate reaction cell of the present invention as long as the system is operated at flows no higher than that required to give 100% ozone conversion. Although the reaction cell in the system of FIG. 1 does emit krypton as a function of the total ozone flux arriving thereat, the counting time within the measuring cell is a function of the flow rate and consequently compensates for any variations therein. Thus, for example, at a particular ozone concentration, if the flow speeds up producing more krypton, this gas sweeps through the measuring cell at this faster speed and is counted for a correspondingly shorter period of time. Likewise, if the flow is slowed down, the reduced krypton is counted for a longer period of time. The result is a signal output which is flow rate independent, varying only in response to ozone concentration. This characteristic, it will be appreciated, is extremely desirable where the apparatus is being used in a high speed, low pressure sampling mode, such as in upper atmospheric research with sonde probes.

From the discussion hereinbefore presented, it will be recognized that the hydroquinone molecule, whether or not in the form of a clathrate at high linear flow velocities, is an inefficient reactor with ozone and an efficient reactor with atomic oxygen arrived at directly or through catalyst decomposition. Specifically, if a reaction cell of hydroquinone with a small free volume of about 0.05 ml. has air containing ozone and atomic oxygen passing therethrough at flow rates of about one liter per minute, ozone will pass therethrough 99% intact while atomic oxygen will react completely. This difference in behavior can be employed in a clathrate instrument or in a chemiluminescent device to separate and measure both of these substances.

Figure 2:
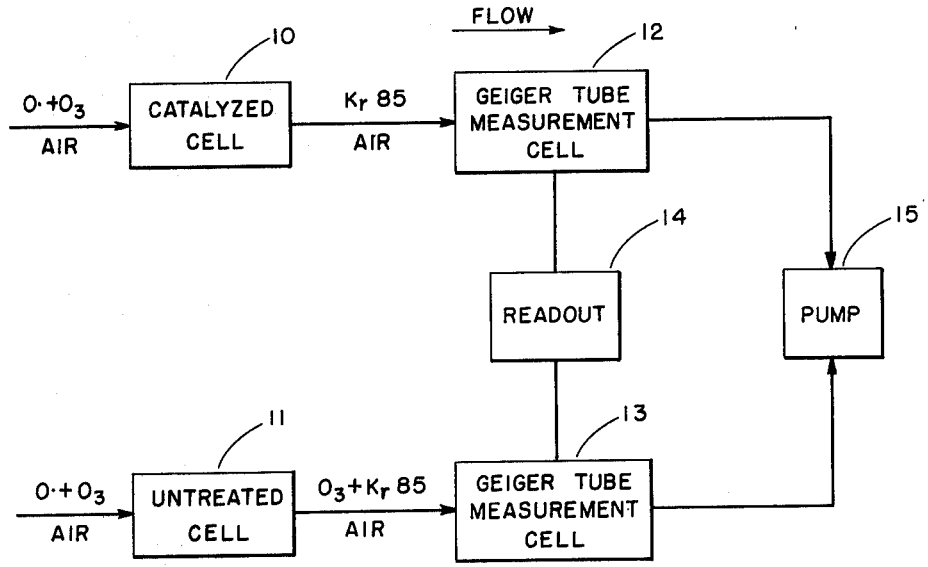
FIG. 2 is a block diagram of a system for measuring the concentration of atomic oxygen and/or ozone in a gaseous medium utilizing clathrate compounds in the sensing detectors.

A system for measuring the ozone concentration in a gaseous medium containing ozone and atomic oxygen is illustrated in block form in FIG. 2. In its simplest configuration, the apparatus consists of two reaction cells, one, 10, containing a catalyzed clathrate and another, 11, containing an untreated clathrate. Both cells are subjected to substantial flow rates by pump 15 which, like its counter part in FIG. 1, produces the flow of the gaseous medium throughout the system.

It will be understood from the introductory remarks that untreated cell 11 responds to atomic oxygen in the gas stream and not to ozone because of the flow rate established by pump 15. However, catalyzed clathrate cell 10 responds to both substances. Consequently, the amount of $Kr^{85}$ introduced into measuring cell 12 is proportional to the concentrations of the above two substances, while the amount of $Kr^{85}$ sent to measuring cell 13 is proportional only to the atomic oxygen content. Hence, the difference in $Kr^{85}$ readings determined by these measuring cells as presented on the readout apparatus 14 is indicative of the ozone concentration only. If the flow rate established by pump 15 is kept no higher than that required for 100% conversion of the ozone in cell 10, then this system will also be flow-rate independent.

Figure 3:
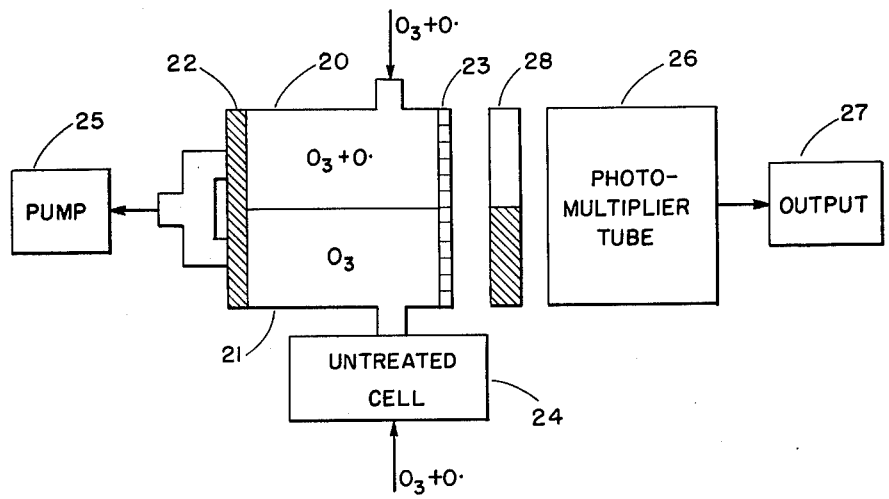
FIG. 3 is an alternative arrangement for measuring the concentration of ozone and/or atomic oxygen employing chemiluminescence.

In FIG. 3 there is disclosed the general arrangement of a chemiluminescent system for measuring the amount of atomic oxygen and ozone in a gaseous medium. As seen in this figure, the apparatus includes a pair of measurement chambers 20 and 21 in a side-by-side relationship, each being closed at one end by a chemiluminescent screen 22 and at the other end, by an optical window 23. One of the intake lines, for example, the one heading to chamber 21, contains an untreated hydroquinone reaction bed 24 for filtering out or removing atomic oxygen passing therethrough.

The atmosphere under investigation is drawn into both chambers under flow rates of about one liter per minute and brought into intimate contact with the chemiluminescent screen 22 by the action of pump 25 which also exists this flow either around or through the screen. Because of the complete reaction of the atomic oxygen with the filter 24, only ozone enters compartment 21. The half life of the atomic oxygen reaction is extremely low, for example, less than one millisecond, and at the flow rate mentioned above, about 99% of the ozone passes through filter 24 without decomposition.

The ozone and atomic oxygen in compartment 20 and the ozone in compartment 21 react with the chemiluminescent material of screen 22 and produce light in a manner well known to the art. The light signal in compartment 20, of course, has the greater intensity because of the atomic oxygen contribution.

Both measurement chambers are viewed through the optical window 23 by means of a rotating shutter 28 disposed in front of a conventional detecting photomultiplier tube 26. This rotating shutter, as is well known, gives the output of the photomultiplier tube as presented on output device 27, a square wave characteristic. The atomic oxygen concentration, it will be appreciated, can be determined by the difference in amplitude of the successive unidirectional wave forms making up the output signal.

Figure 4:
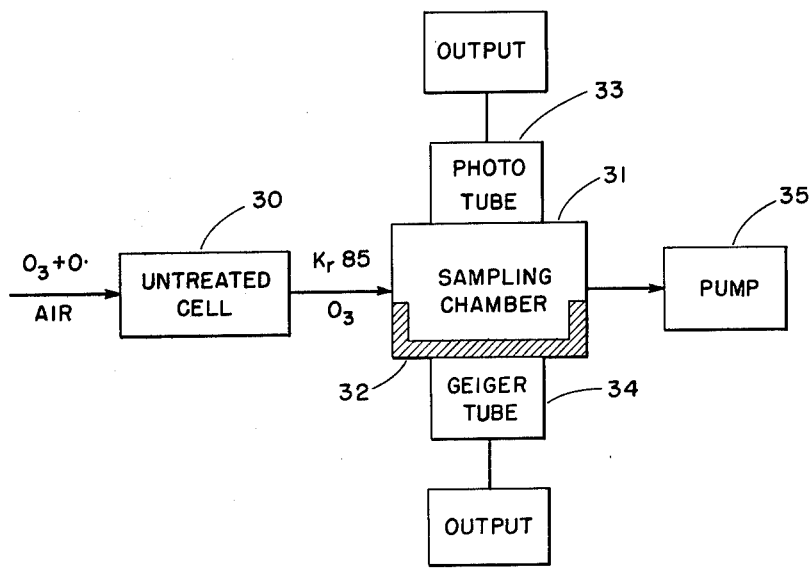
FIG. 4 is a hybird system for measuring and detecting ozone and/or atomic oxygen employing both clathrate compounds and chemiluminescence.

Analyzers for measuring and differentiating atomic oxygen and ozone can, as shown above, make use of clathrates or chemiluminescents. A hybrid system using both of these mechanisms is schematically depicted in FIG. 4. Here, the air stream is drawn into an untreated clathrate cell 30 which liberates $Kr^{85}$ according to the atomic oxygen concentration thereof. The ozone in this stream passes through the cell without reacting because of the flow rate. The released radioactive krypton and the ozone next enter a sampling chamber 31 which has a chemiluminescent screen 32 mounted on an inner wall portion thereof. A photomultiplier tube 33 mounted on an opposite wall of the chamber views this screen and a Geiger tube 34 attached to the chamber detects the radioactive krypton. An exhaust pump 35 establishes the flow throughout the system.

It will be appreciated that Geiger tube 34 measures the amount of $Kr^{85}$ liberated by the atomic oxygen in the incoming air stream and that photomultiplier tube registers the amount of light produced by the reaction of ozone on screen 32. Consequently, the system of FIG. 4 provides complete information as to the concentration of the atomic oxygen and the ozone in the gaseous medium under investigation.

The chemiluminescent screens employed in the modification of FIGS. 3 and 4 can consist of a fluorescent dye on a suitable matrix. Typical dyes are Fluorescein, eosin, Rhodamine B, etc. Typical matrices are silica gel, silicates, paper, etc.

The hybrid system of FIG. 4 has several noteworthy advantages. First, a system using chemiluminescents must be shielded from the light, and this requirement makes it difficult to pass highly reactive atomic oxygen into the sampling chamber. In the modification of FIG. 4, the atomic oxygen content is measured by a radioactive counting technique, thereby avoiding the above problem. Secondly, chemiluminescence is a more sensitive and rapid indicator for ozone concentrations than clathrates.

In the system of FIG. 2 the differential reading of Geiger tubes 12 and 13 is indicative of the atomic oxygen concentration. However, the ozone concentration can also be determined from the output of tube 13. Likewise, in the system of FIG. 3, the difference in amplitude between the two square wave signals is proportional to the atomic oxygen content but the ozone content can be found from the amplitude of the smaller signal. In the system of FIG. 4, these concentrations are directly available from the photomultiplier and Geiger tube outputs.

Obviously many modifications and variations of the present invention are possible in the light of the above teachings. It is therefore to be understood that within the scope of the appended claims the invention may be practiced otherwise than as specifically described.

What is claimed is:
1. In a method for determining the presence and concentration of ozone in a gaseous medium, the steps of
passing said gaseous medium through a reaction cell containing hydroquinone clathrated with a radioactive gas and a catalyst mixed therewith for decomposing ozone to atomic oxygen;
and measuring the amount of radioactive gas released by the oxidation of said hydroquinone by the atomic oxygen produced by said decomposition.
2. In a system for determining the presence and concentration of ozone and atomic oxygen in a gaseous medium, the combination of
first and second reaction cells, each cell containing hydroquinone clathrated with a radioactive gas;
said second cell also containing a catalyst for rapidly decomposing ozone to atomic oxygen;
means for passing said gaseous medium through both cells at a flow rate which permits the ozone in said gaseous medium to decompose into atomic oxygen during the passage of said gaseous medium through said second cell;
and means for measuring the amount of radioactive gas liberated in each of said reaction cells, the amount of radioactive gas liberated in said first cell being proportional to the atomic oxygen concentra- tion and the difference between the amount of radioactive gas liberated in said cells being proportional to the ozone concentration.

3. In a system for determining the presence and concentration of ozone and atomic oxygen in a gaseous medium, the combination of
   first and second reaction cells, each cell containing hydroquinone clathrated with a radioactive gas, said second cell also containing a silica compound and platinum black;
   means for passing said gaseous medium through both cells at the same slow rate, said slow rate being such that the ozone in said gaseous medium does not remain in said first cell long enough to react in any substantial degree with said hydroquinone, and also being such that the ozone in said gaseous medium remains in said second cell long enough to be decomposed by said silica compound and said platinum black into atomic oxygen;
   and means for measuring the amount of radioactive gas liberated in each of said cells in response to the oxidation of said hydroquinone.

4. In a method for determining the presence and concentration of ozone in a gaseous medium, the steps of
   passing a stream of said gaseous medium through a reaction cell which contains materials which decompose ozone into atomic oxygen and which react with atomic oxygen to liberate a radioactive gas;
   the flow rate of said stream through said cell being such that substantially all the ozone in said stream is decomposed during its passage through said cell;
   and passing said stream with said radioactive gas contained therein through a measuring cell equipped with radioactivity detecting and measuring apparatus at the above flow rate.

5. In a system for ascertaining the presence and amount of ozone and atomic oxygen in a gaseous medium, the combination of
   first and second reaction cells of similar capacity, each of said cells containing hydroquinone clathrated with a radioactive gas;
   said second cell also containing a material for rapidly decomposing ozone to atomic oxygen;
   means for passing a stream of said gaseous medium through each cell at the same flow rate, said flow rate being such that substantially all of the ozone in said stream passes through said first cell without reacting with said hydroquinone and such that substantially all of the ozone in said stream remains within said second cell long enough to be decomposed into atomic oxygen, whereby the amount of radioactive gas released in said first cell is proportional to the amount of atomic oxygen in said gaseous medium and the amount of radioactive gas released in said second cell is proportional to the amount of atomic oxygen and ozone in said gaseous medium;
   first and second measuring cells equipped with radioactivity measuring and detecting apparatus;
   and means for passing the radioactive gas released from said first and second reaction cells through said first and second measuring cells, respectively, at said flow rate.

6. In a method for ascertaining the amount of atomic oxygen and ozone present in a gaseous medium, the steps of
   passing a stream of said gaseous medium through a reaction cell containing hydroquinone clathrated with a radioactive gas at a flow rate such that the atomic oxygen in said stream reacts with said hydroquinone but said ozone in said stream passes through without reacting with said hydroquinone;
   passing said stream at the same flow rate next into a sampling chamber which contains a chemiluminescent material;
   and measuring simultaneously the amount of radioactive gas liberated by the reaction of said atomic oxygen with said hydroquinone and the amount of light produced by the ozone reacting with the chemiluminescent material which is in said sampling chamber.

7. In a system for ascertaining the amount of atomic oxygen and ozone present in a gaseous medium, the combination of
   a reaction cell containing hydroquinone clathrated with a radioactive gas;
   a measuring cell having a chemiluminescent material disposed therein;
   means for drawing a stream of said gaseous medium first through said reaction cell and then through said measuring cell at the same flow rate, which flow rate is slow enough to permit all of the atomic oxygen in said stream to react with said hydroquinone in said reaction cell to liberate a proportional amount of radioactive gas, but fast enough to allow substantially all of said ozone in said stream to pass through said reaction cell without reacting with said hydroquinone;
   and means associated with said measuring cell for measuring simultaneously the amount of radioactive gas within said cell and the amount of light produced within said cell as a consequence of the ozone in said stream reacting with said chemiluminescent material.

8. In an arrangement as defined in claim 7 wherein said means, associated with said measuring cell for simultaneously measuring the amount of radioactive gas passing through said cell and the amount of light energy produced within said cell as a consequence of the ozone in said stream reacting with said chemiluminescent material, includes
   a phototube mounted on one wall of said cell and adapted to view said chemiluminescent material;
   and a Geiger tube mounted on an opposite wall of said measuring cell.

References Cited by the Examiner
UNITED STATES PATENTS

| | | | |
|---|---|---|---|
| 2,955,088 | 10/1960 | Beerbower et al. | 252—301.1 |
| 2,968,722 | 1/1961 | Chleck et al. | 250—43.5 |
| 3,025,141 | 3/1962 | Van der Smissen | 23—232 |
| 3,114,610 | 12/1963 | Gafford et al. | 23—255 |

FOREIGN PATENTS

| | | |
|---|---|---|
| 843,838 | 8/1960 | Great Britain. |

OTHER REFERENCES

Hughes et al.: AERE–R3359, United Kingdom Atomic Energy Authority Report, 1960.

RALPH G. NILSON, *Primary Examiner.*

DELBERT E. GANTZ, ARCHIE R. BORCHELT,
*Examiners.*